(12) United States Patent
Tomoda et al.

(10) Patent No.: US 10,286,455 B2
(45) Date of Patent: May 14, 2019

(54) THROW-AWAY TIP

(71) Applicant: SUMITOMO ELECTRIC HARDMETAL CORP., Itami-shi (JP)

(72) Inventors: Yuji Tomoda, Itami (JP); Yasuyuki Kanada, Itami (JP); Kunishige Tanaka, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 117 days.

(21) Appl. No.: 15/027,394

(22) PCT Filed: Jul. 31, 2015

(86) PCT No.: PCT/JP2015/071765
§ 371 (c)(1),
(2) Date: Apr. 5, 2016

(87) PCT Pub. No.: WO2016/035490
PCT Pub. Date: Mar. 10, 2016

(65) Prior Publication Data
US 2016/0243624 A1 Aug. 25, 2016

(30) Foreign Application Priority Data
Sep. 5, 2014 (JP) .................................. 2014-181296

(51) Int. Cl.
*B23B 27/20* (2006.01)
*B23B 27/22* (2006.01)
*B23B 27/14* (2006.01)

(52) U.S. Cl.
CPC ............ *B23B 27/20* (2013.01); *B23B 27/143* (2013.01); *B23B 27/22* (2013.01);
(Continued)

(58) Field of Classification Search
CPC ...... B23B 2202/0447; B23B 2200/087; B23B 2226/31; B23B 27/143; B23B 27/20; B23B 27/22
See application file for complete search history.

(56) References Cited

U.S. PATENT DOCUMENTS 3,866,282 A * 2/1975 Lundgren ............. B23B 27/143
407/113
4,056,871 A * 11/1977 Bator .................... B23B 27/143
407/114
(Continued)

FOREIGN PATENT DOCUMENTS

CN 102006954 A 4/2011
CN 202498228 U 10/2012
(Continued)

OTHER PUBLICATIONS

Notification of the First Office Action in counterpart Chinese Patent Application No. 201580002409.X, dated Feb. 15, 2017.
(Continued)

*Primary Examiner* — Sara Addisu
(74) *Attorney, Agent, or Firm* — Baker Botts L.L.P.; Michael A. Sartori (57) ABSTRACT

There is provided a throw-away tip which includes a blade containing diamond and is excellent in chip processability. The throw-away tip comprises a body and a blade provided to the body and having a cutting edge, the blade containing 80% by volume or more of diamond, the blade having a land surface extending along the cutting edge, and a chip breaker having a recess located opposite to the cutting edge with the land surface therebetween, the recess having a side surface having an inclined surface that recedes continuously as a distance thereof from the land surface increases in magnitude and that has a shape identical to that of a portion of a side surface of a shape of a body of revolution.

13 Claims, 4 Drawing Sheets

(52) U.S. Cl.
CPC . *B23B 2200/0447* (2013.01); *B23B 2200/087* (2013.01); *B23B 2226/31* (2013.01); *B23B 2228/04* (2013.01)

(56) References Cited

U.S. PATENT DOCUMENTS

| | | | | |
|---|---|---|---|---|
| 4,616,963 A * | 10/1986 | Habert | ............ | B23B 27/22 407/114 |
| 4,685,844 A * | 8/1987 | McCreery | ............ | B23B 27/143 407/114 |
| 4,720,217 A * | 1/1988 | Bonjour | ............ | B23B 27/143 407/114 |
| 4,787,784 A * | 11/1988 | Bernadic | ............ | B23B 27/143 407/114 |
| 4,856,942 A * | 8/1989 | Bernadic | ............ | B23B 27/143 407/114 |
| 4,880,338 A * | 11/1989 | Stashko | ............ | B23B 27/143 407/114 |
| 4,941,780 A * | 7/1990 | Takahashi | ............ | B23B 27/143 407/114 |
| 4,993,893 A * | 2/1991 | Niebauer | ............ | B23B 27/065 407/113 |
| 5,141,367 A * | 8/1992 | Beeghly | ............ | B23B 27/143 407/114 |
| 5,215,415 A | 6/1993 | Fukuoka et al. | | |
| 5,372,463 A * | 12/1994 | Takahashi | ............ | B23B 27/143 407/114 |
| 5,476,346 A * | 12/1995 | Lundstrom | ............ | B23B 27/143 407/114 |
| 5,569,000 A * | 10/1996 | Littecke | ............ | B22F 7/06 407/114 |
| 5,584,616 A * | 12/1996 | Katbi | ............ | B23B 27/143 407/114 |
| 5,695,303 A * | 12/1997 | Boianjiu | ............ | B23B 27/141 407/114 |
| 5,743,681 A * | 4/1998 | Wiman | ............ | B23B 27/143 407/114 |
| 5,947,651 A * | 9/1999 | Murakami | ............ | B23B 27/143 407/114 |
| 7,234,901 B2 * | 6/2007 | Ishida | ............ | B23B 27/141 407/114 |
| 2010/0275749 A1 | 11/2010 | Kobayashi | | |
| 2011/0033252 A1 | 2/2011 | Nishida | | |
| 2012/0051855 A1 * | 3/2012 | Lof | ............ | B23B 27/143 407/114 |
| 2012/0087751 A1 * | 4/2012 | Yamaguchi | ............ | B23B 27/143 407/115 |
| 2013/0094914 A1 | 4/2013 | Majima | | |
| 2015/0176155 A1 | 6/2015 | Ueda et al. | | |
| 2016/0207115 A1 * | 7/2016 | Ikenaga | ............ | B23B 27/045 |

FOREIGN PATENT DOCUMENTS

| | | |
|---|---|---|
| CN | 102905824 A | 1/2013 |
| DE | 202006002827 U1 | 4/2006 |
| EP | 0480394 A2 | 4/1992 |
| EP | 1023961 A1 | 8/2000 |
| EP | 2067552 A1 | 6/2009 |
| EP | 2570211 A1 | 3/2013 |
| JP | 04-217404 A | 8/1992 |
| JP | 04-217405 A | 8/1992 |
| JP | 04-217406 A | 8/1992 |
| JP | 08-015681 B2 | 2/1996 |
| JP | 2523987 Y2 | 1/1997 |
| JP | 2007-216327 A | 8/2007 |
| JP | 4583222 B2 | 11/2010 |
| WO | 2013/142885 A1 | 10/2013 |
| WO | WO-2014/003110 A1 | 1/2014 |

OTHER PUBLICATIONS

International Search Report in PCT International Application No. PCT/JP2015/071765, dated Aug. 25, 2015.

* cited by examiner

THROW-AWAY TIP

TECHNICAL FIELD

The present invention relates to a throw-away tip and more specifically to a throw-away tip comprising a blade containing diamond.

BACKGROUND ART

In order to enhance chip processability in cutting, a throw-away tip is provided with a chip breaker such as a breaker groove and a breaker wall.

For example, Japanese Patent Laying-Open No. 4-217404 (PTD 1), Japanese Patent Laying-Open No. 4-217405 (PTD 2), and Japanese Patent Laying-Open No. 4-217406 (PTD 3) disclose defining a chip breaker in surface roughness to curl chips spirally.

CITATION LIST

Patent Documents

PTD 1: Japanese Patent Laying-Open No. 4-217404
PTD 2: Japanese Patent Laying-Open No. 4-217405
PTD 3: Japanese Patent Laying-Open No. 4-217406

SUMMARY OF INVENTION

Technical Problem

PTDs 1-3 describe forming a chip breaker by electro-discharge machining or grinding, and accordingly, the chip breaker is shaped in the form of a simple groove. Accordingly, depending on the working condition(s), it cannot curl chips spirally and cannot obtain desired chip processability. Furthermore, the chip breaker formed by electro-discharge machining has a blade with a rake face that is an electro-discharge machined surface, and the blade's cutting edge cannot be formed sharply. Thus, when the throw-away tips disclosed in PTDs 1-3 are used to work a workpiece, the workpiece has aggravated finished surface roughness.

Furthermore, diamond is used for a blade to improve a throw-away tip in strength and wear resistance. However, diamond has large hardness and is thus not easily processed, and thus it is difficult to use it to form a chip breaker excellent in chip processability.

Accordingly, the present invention contemplates a throw-away tip which includes a blade containing diamond and is excellent in chip processability.

Solution to Problem

The present invention in one manner provides a throw-away tip comprising a body and a blade provided to the body and having a cutting edge, the blade containing 80% by volume or more of diamond, the blade having a land surface extending along the cutting edge, and a chip breaker having a recess located opposite to the cutting edge with the land surface therebetween, the recess having a side surface having a rake face that recedes continuously as a distance thereof from the land surface increases in magnitude and that has a shape identical to that of a portion of a side surface of a shape of a body of revolution.

Advantageous Effect of Invention

In this manner, there can be provided a throw-away tip which includes a blade containing diamond and is excellent in chip processability.

DESCRIPTION OF EMBODIMENTS

Description of Embodiment of the Present Invention

Initially, embodiments of the present invention are enumerated and described.

The present invention in one manner provides a throw-away tip (1) comprising a body and a blade provided to the body and having a cutting edge, the blade containing 80% by volume or more of diamond, the blade having a land surface extending along the cutting edge, and a chip breaker having a recess located opposite to the cutting edge with the land surface therebetween, the recess having a side surface having a rake face that recedes continuously as a distance thereof from the land surface increases in magnitude and that has a shape identical to that of a portion of a side surface of a shape of a body of revolution.

The throw-away tip according to one manner of the present invention that has a blade including a chip breaker having a recess with a side surface having a rake face that recedes continuously as a distance thereof from the land surface increases in magnitude and that has a shape identical to that of a portion of a side surface of a shape of a body of revolution allows a workpiece to be cut such that chips flow out along the rake face of the chip breaker toward the bottom of the rake face, and large distortion can be imparted to the chips. The throw-away tip according to one manner of the present invention can thus exhibit excellent chip processability under a variety of cutting conditions. Furthermore, the throw-away tip according to one manner of the present invention has a blade containing 80% by volume or more of diamond and hence excellent in strength and wear resistance.

(2) Preferably, an angle of inclination of the rake face relative to the land surface is in a range of 15° or more and 50° or less. This allows cutting to be done with chips easily flowing out along the rake face and thus enhances the throw-away tip's chip processability. Furthermore, it can also maintain strength of the cutting edge of the blade and thus also enhance the throw-away tip in longevity as a tool. In the present specification, an angle of inclination of the rake face relative to the land surface is an acute angle among angles formed by a plane assumed when the land surface is extended to above the recess (hereinafter also referred to as a "top plane of the recess") and the rake face.

(3) Preferably, the land surface has a width in a direction perpendicular to the cutting edge in a range of 10 μm or more and 100 μm or less. This allows cutting to be done while preventing chips from running up onto the land surface and thus enhances the throw-away tip's chip processability. Furthermore, it can also maintain strength of the cutting edge of the blade and thus also enhance the throw-away tip in longevity as a tool. Note that the direction perpendicular to the cutting edge means a direction along a straight line which is perpendicular to the cutting edge and is also located on the land surface. Note that if the cutting edge is curved, the direction means a direction along a straight line which is perpendicular to a tangent of the curve and is also located on the land surface.

(4) Preferably, the recess has a maximum depth in a range of 60 μm or more and 300 μm or less. This allows cutting to be done with distortion effectively imparted to chips and thus enhances the throw-away tip's chip processability.

(5) Preferably, the recess has a width in a direction perpendicular to the cutting edge in a range of 0.2 mm or more and 1.0 mm or less. This allows chips flowing out in cutting to collide against an inclined surface that is raised from a rear end of the rake face of the recess of the chip breaker toward an upper surface of the blade (hereinafter also referred to as the breaker's wall surface), without running up onto the upper surface of the blade, to help to shred the chips and thus enhance the throw-away tip's chip processability.

(6) Preferably, the blade has a corner, the recess has on a side surface of the recess a projection formed along a bisector of an angle of the corner, and the projection has a height in a range of 20% or more and 80% or less relative to a maximum depth of the recess. This allows chips flowing out in cutting to collide against the projection, without running up onto the projection, to help to shred the chips and thus enhance the throw-away tip's chip processability.

(7) Preferably, when the projection is seen in a cross section to which the bisector of the angle of the corner is a normal, the projection has a cross sectional shape increasing in width as the recess becomes deeper, and the cross sectional shape in a widthwise direction has a minimum value in a range of 5 μm or more and 40 μm or less. This allows chips flowing out in cutting to collide against the projection, without running up onto the projection, to help to shred the chips and thus enhance the throw-away tip's chip processability.

(8) Preferably, the projection has a length in a direction along the bisector of the angle of the corner in a range of 0.2 mm or more and 1.0 mm or less. This helps chips flowing out in cutting to collide against the projection to help to shred the chips and thus enhance the throw-away tip's chip processability.

(9) Preferably, the land surface has a surface roughness in a range of 0.05 μm or more and 0.2 μm or less, and the rake face has a surface roughness in a range of 2 μm or more and 7 μm or less. The land surface having a surface roughness in a range of 0.05 μm or more and 0.2 μm or less allows the blade to have a cutting edge formed sharply to thus provide a workpiece with satisfactory finished surface roughness. Furthermore, the rake face having a surface roughness in a range of 2 μm or more and 7 μm or less increases resistance caused when the chips having flown out in cutting scratch the surface of the rake face, and the chips are easily curled and the throw-away tip's chip processability is thus improved.

(10) Preferably, the diamond is single crystal diamond synthesized by vapor deposition. Single crystal diamond is excellent in strength and wear resistance, and the throw-away tip can have excellent wear resistance and have a cutting edge with sharpness (i.e., edge sharpening performance).

(11) Preferably, the single crystal diamond has an absorption coefficient in a range of 2 $cm^{-1}$ or more and 90 $cm^{-1}$ or less for laser light of 190 nm or more and 11000 nm or less in wavelength. The single crystal diamond having an absorption coefficient in a range of 2 $cm^{-1}$ or more and 90 $cm^{-1}$ or less easily absorbs laser light. The single crystal diamond can thus be easily laser-machined to provide a blade with a chip breaker shaped as desired to thus enhance the throw-away tip's chip processability.

Description of Embodiments

A specific example of a throw-away tip according to an embodiment of the present invention will now be described with reference to the drawings below. Note that the present invention is defined by the terms of the claims, rather than these examples, and is intended to include any modifications within the meaning and scope equivalent to the terms of the claims.

Figure 1:
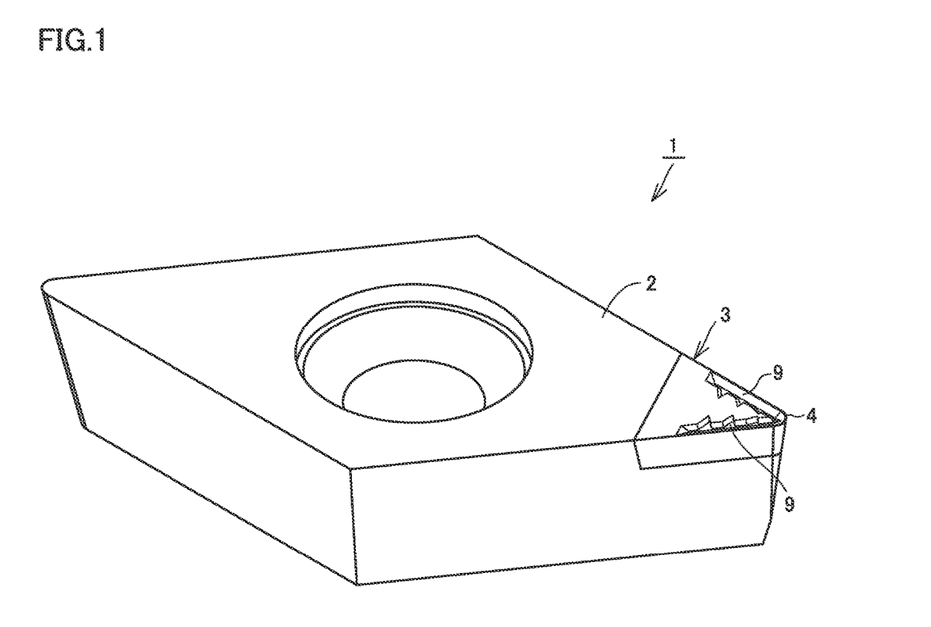
FIG. 1 illustrates a representative configuration example of a throw-away tip according to one manner of the present invention.
Figure 2:
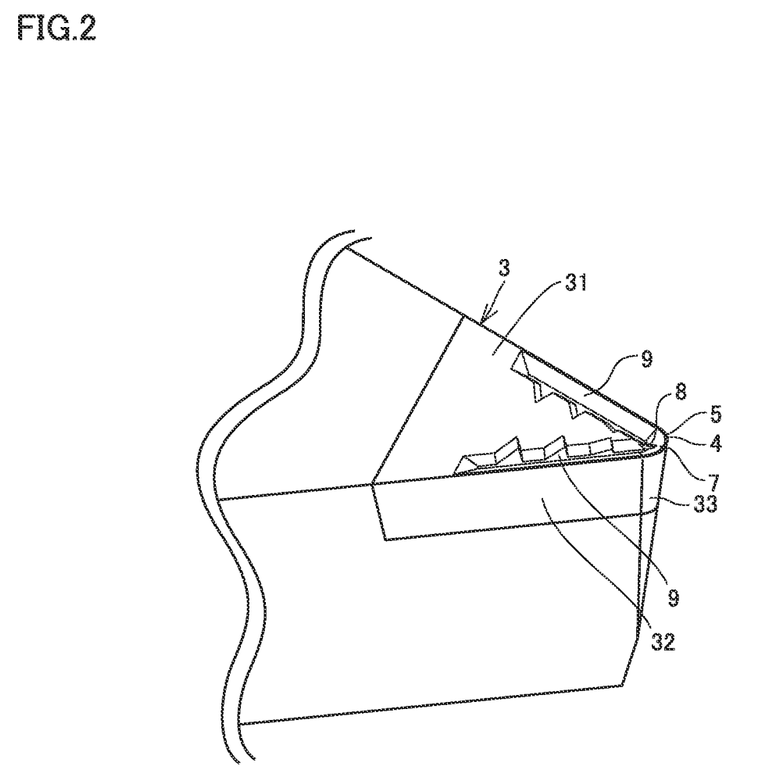
FIG. 2 is an enlarged view of a blade of a throw-away tip shown in FIG. 1.
Figure 3:
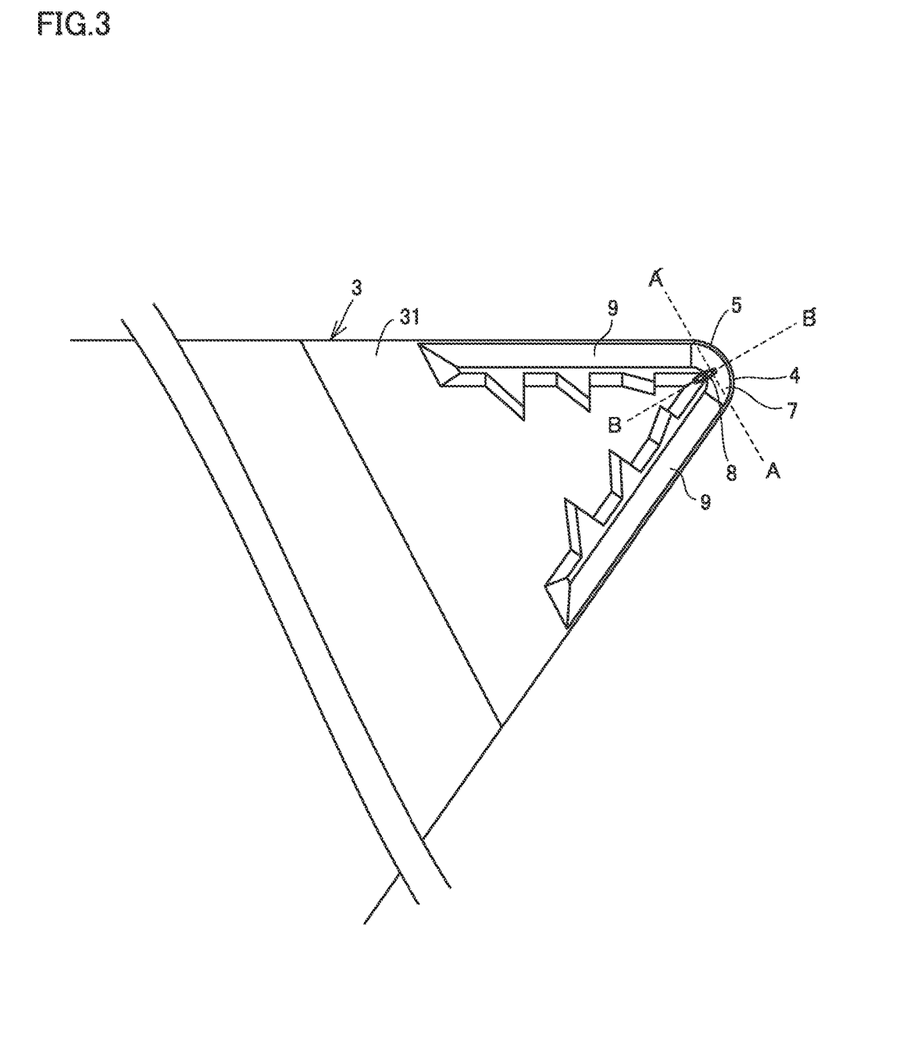
FIG. 3 is a top view of the blade of the throw-away tip shown in FIG. 1.
Figure 4:
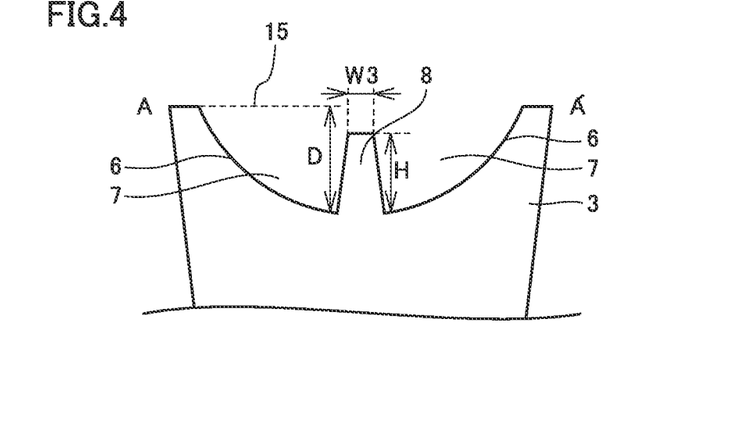
FIG. 4 is a cross section along a line A-A' of FIG. 3.
Figure 5:
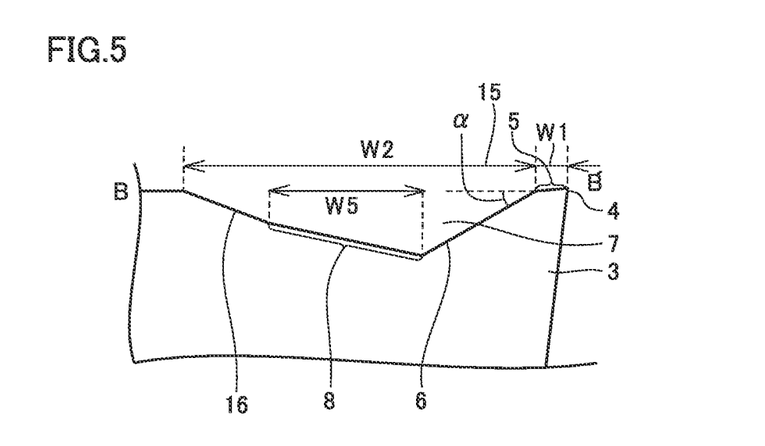
FIG. 5 is a cross section along a line B-B' of FIG. 3.

FIG. 1 is a perspective view of a throw-away tip 1 of one embodiment of the present invention. FIG. 2 is an enlarged perspective view of a blade 3 of throw-away tip 1 shown in FIG. 1. FIG. 3 is an enlarged top view of blade 3 of throw-away tip 1 shown in FIG. 1. FIG. 4 is a cross section along a line A-A' of FIG. 3. FIG. 5 is a cross section along a line B-B' of FIG. 3.

With reference to FIG. 1, throw-away tip 1 of the present embodiment includes a body 2 and a blade 3 provided to body 2. While throw-away tip 1 of FIG. 1 is a parallelogram in a plan view, it is not limited to any particular shape. While throw-away tip of FIG. 1 has body 2 with a plurality of corners having one thereof provided with blade 3, two or more corners may be provided with blade 3. Body 2 can be formed of material such as steel, cemented carbide, etc. Body 2 has an upper surface with a corner notched to allow blade 3 to be adhered thereto. The notch is formed by opening the corner's upper and lateral sides. The notch has a triangular bottom surface in a top plan view, and a side wall erected vertically from the bottom surface.

Blade 3 is adhered to the notch of body 2. Blade 3 has a generally triangular upper surface 31 identical to the bottom surface of the notch in a top plan view, a bottom surface opposite to upper surface 31 and identical in shape to upper surface 31, and a side surface 32 connecting a periphery of upper surface 31 and a periphery of bottom surface 31. Of side surface 32, a surface located over a corner of the body configures a flank 33 of the throw-away tip.

Of the sides configuring the periphery of upper surface 31 of blade 3, a side formed by a ridge line of a position at which the blade 3 upper surface 31 and side surface 32 cross each other configures a cutting edge 4.

At blade 3, a chip breaker 9 is formed to extend along the ridge line of the position at which the blade 3 upper surface 31 and side surface 32 cross each other. Chip breaker 9 includes a recess 7 formed along cutting edge 4.

Blade 3 contains 80% by volume or more of diamond. Diamond is excellent in strength and wear resistance, and the blade containing diamond can be excellent in strength and wear resistance, and can enhance the chip breaker in longevity as a tool. Preferably, blade 3 has a diamond content of 90% by volume or more, more preferably 95% by volume or more.

The diamond can be a sintered diamond compact of sintered powdery diamond, single crystal diamond synthesized by chemical vapor deposition (CVD), etc. When the diamond sintered compact is used for blade 3, the blade has excellent wear resistance in working of nonferrous metal in particular, and can provide satisfactory finished surface. When the single crystal diamond synthesized by CVD is used for blade 3, the blade can have excellent wear resistance and have a cutting edge with sharpness (i.e., edge sharpening performance).

Preferably, the single crystal diamond has an absorption coefficient in a range of 2 $cm^{-1}$ or more and 90 $cm^{-1}$ or less for a laser wavelength in a wavelength range of 190 nm or more and 11000 nm or less. When the single crystal diamond has an absorption coefficient in said range, it easily absorbs laser light, which helps laser-machining of blade 3. This allows blade 3 to be worked to have a desired contour and the chip breaker to be formed at blade 3 with high precision. When the laser wavelength is 1064 nm, it is more preferable that the single crystal diamond have an absorption coefficient in a range of 5 $cm^{-1}$ or more and 20 $cm^{-1}$ or less. When the laser wavelength is 532 nm, it is more preferable that the single crystal diamond have an absorption coefficient in a range of 30 $cm^{-1}$ or more and 70 $cm^{-1}$ or less. When the laser wavelength is 355 nm, it is more preferable that the single crystal diamond have an absorption coefficient in a range of 60 $cm^{-1}$ or more and 90 $cm^{-1}$ or less.

Blade 3 has upper surface 31 with a land surface 5 formed to extend along cutting edge 4. With reference to FIG. 5, land surface 5 has a determined width W1 in a direction perpendicular to cutting edge 4 and extending toward the center of upper surface 31. Land surface 5 preferably has width W1 in a range of 10 μm or more and 100 μm or less. Land surface 5 having width W1 of 10 μm or more allows the blade to have the cutting edge with strength maintained and can prevent the cutting edge from chipping and thus enhance the throw-away tip in longevity as a tool. Land surface 5 having width W1 of 100 μm or less allows cutting to be done while preventing chips from running up onto the land surface and thus being large in length and enhances the throw-away tip's chip processability. Further preferably, land surface 5 has width W1 of 10 μm or more and 70 μm or less.

Preferably, land surface 5 has a surface roughness in a range of 0.05 μm or more and 0.2 μm or less. This allows the blade to have a cutting edge formed sharply and thus provides a workpiece with satisfactory finished surface roughness. Herein, surface roughness is a ten-point average height (Rz). More specifically, it is a value that is obtained in a portion extracted from a profile curve only by a reference length and represents a difference between an average value of the highest to fifth highest peaks' altitudes and an average value of the deepest to fifth deepest troughs' altitudes, as represented in micrometers (μm). Further preferably, land surface 5 has a surface roughness in a range of 0.08 μm or more and 0.15 μm or less.

Blade 3 has upper surface 31 with chip breaker 9 formed opposite to cutting edge 4 with land surface 5 therebetween and having a recess 7. Herein, recess 7 is a portion of chip breaker 9 that is formed along cutting edge 4 in a vicinity of a corner. A side surface which forms an outer contour of recess 7 includes a rake face 6 which recedes continuously from land surface 5 as a distance toward the center of blade 3 increases in magnitude, and a breaker wall surface 16 which is raised from a rear end of rake face 6 toward upper surface 31 of blade 3. This allows chips flowing out in cutting a workpiece to first flow out along rake face 6 toward the bottom of rake face 6. At the time, distortion is imparted to the chips and thus helps to shred the chips. Subsequently, the chips reach the bottom of rake face 6 and collide against breaker wall surface 16. At the time, the chips are shredded by the collision. Or the chips are shredded as further distortion is imparted thereto.

Rake face 6 is identical in shape to a portion of a side surface of the shape of a body of revolution. According to this, in recess 7 of blade 3, in cutting a workpiece, chips flow out along rake face 6 of the chip breaker toward the bottom of rake face 6, and large distortion can be imparted to the chips. Herein, the shape of the body of revolution means a solid that can be formed by revolving a plane figure once with a straight line on its plane serving as an axis of revolution. The shape of the body of revolution includes a sphere, a cone, etc., for example. When the shape of the body of revolution has the axis on a bisector of the corner angle of blade 3, chips flow toward the maximum depth of the bottom located under the bisector of the corner angle, and larger distortion can be imparted to the chips. Preferably, rake face 6 has a shape identical to a portion of a side surface of a cone. This can maintain the cutting edge's strength.

With reference to FIG. 5, an angle of inclination α of rake face 6 relative to land surface 5 is preferably in a range of 15° or more and 50° or less. This allows cutting to be done with chips easily flowing out along the rake face and thus enhances the throw-away tip's chip processability. Furthermore, it can also maintain strength of the cutting edge of the blade and thus also enhance the throw-away tip in longevity as a tool. Note that angle of inclination α of rake face 6 relative to land surface 5 is an acute angle among angles formed by a plane 15 assumed when land surface 5 is extended to above the recess (hereinafter also referred to as a "top plane of the recess") and rake face 6. Angle of inclination α of rake face 6 relative to land surface 5 is more preferably 20° or more and 40° or less.

Rake face 6 preferably has a surface roughness in a range of 2 μm or more and 7 μm or less. This increases resistance caused when chips flowing out in cutting scratch the surface of the rake face, and the chips are easily curled and the throw-away tip's chip processability is thus improved. Herein, surface roughness is a ten-point average height (Rz). Rake face 6 more preferably has a surface roughness in a range of 3.0 μm or more and 6.0 μm or less.

With reference to FIG. 4, recess 7 preferably has a maximum depth D in a range of 60 μm or more and 300 μm or less. This allows cutting to be done with distortion effectively imparted to chips and thus enhances the throw-away tip's chip processability. Note that maximum depth D of recess 7 is a maximum value of a distance to the bottom of the recess from plane 15 assumed when land surface 5 is extended to above the recess (i.e., the top plane of the recess). Further preferably, recess 7 has maximum depth D in a range of 60 μm or more and 200 μm or less.

With reference to FIG. 5, recess 7 preferably has a width 2 in a direction perpendicular to cutting edge 4 (hereinafter also referred to as a "width of the recess") in a range of 0.2 mm or more and 1.0 mm or less. This allows chips flowing out in cutting to collide against breaker wall surface 16, without running up onto upper surface 31 of blade 3, to help to shred the chips and thus enhance the throw-away tip's chip processability. Note that width 2 in the direction perpendicular to cutting edge 4 means a distance between an end of the opening of the recess closer to the land surface and an end of the opening of the recess closer to the center of the blade, as seen in a direction along a straight line which is perpendicular to cutting edge 4 and is also located on the top plane of the recess. Note that if the cutting edge is curved, width 2 means a distance between an end of the opening of the recess closer to the land surface and an end of the opening of the recess closer to the center of the blade, as seen in a direction along a straight line which is perpendicular to a tangent of the curve and is also located on the top plane of the recess. Recess 7 more preferably has width 2 in the direction perpendicular to cutting edge 4 in a range of 0.25 mm or more and 0.7 mm or less.

With reference to FIG. 3 to FIG. 5, preferably, on a side surface of recess 7, a projection 8 is formed along a bisector (B-B') of the corner angle of blade 3. This allows chips flowing out in cutting a workpiece to collide against projection 8 and thus be shredded or imparts further distortion to the chips and thus shred the chips. When projection 8 is formed along the bisector of the corner angle of blade 3, projection 8 will exist on a path along which chips flow out, which can more effectively shred the chips. Preferably, projection 8 has a height H in a range of 20% or more and 80% or less relative to maximum depth D of the recess. This allows chips flowing out in cutting to collide against projection 8, without running up onto the projection, to help to shred the chips. Furthermore, projection 8 having height H of 80% or less relative to maximum depth D of the recess can be prevented from being worn in cutting and thus enhance the throw-away tip in longevity as a tool. Note that height H of projection 8 is a height of the projection as seen in a cross section to which the bisector (B-B') of the corner angle is a normal and that traverses a position at which the recess presents maximum depth D.

Preferably, when projection 8 is seen in the cross section to which the bisector of the corner angle is a normal, it has a cross sectional shape increasing in width as the recess becomes deeper. The cross sectional shape of projection 8 can be a triangle, a trapezoid, etc., for example. The cross sectional shape of the projection in a widthwise direction W3 preferably has a minimum value (hereinafter also referred to as a "minimum width of the projection") in a range of 5 μm or more and 40 μm or less. This allows chips flowing out in cutting to collide against the projection, without running up onto the projection, to help to shred the chips and thus enhance the throw-away tip's chip processability. More preferably, the cross sectional shape of the projection in widthwise direction W3 preferably has a minimum value in a range of 10 μm or more and 20 μm or less.

Projection 8, as seen in a direction along the bisector of the corner angle, preferably has a length W5 in a range of 0.2 mm or more and 1.0 mm or less. This helps chips flowing out in cutting to collide against the projection to help to shred the chips and thus enhance the throw-away tip's chip processability. Projection 8, as seen in the direction along the bisector of the corner angle, more preferably has length W5 in a range of 0.25 mm or more and 0.7 mm or less.

An example of a method for manufacturing the throw-away tip of the present embodiment will now be described. Body 2 having a notch, and blade 3 containing 80% by volume or more of diamond are prepared. The blade is brazed to the notch of the body, and ground with a diamond wheel to have a cutting edge. Subsequently, a high output pulsed laser is used to work a surface of blade 3 to form chip breaker 9. Conventionally, a blade containing diamond is worked by electro-discharge machining, grinding or the like, which limits a chip breaker to a simple shape. In contrast, in the present embodiment, blade 3 is worked with precise positioning done by laser irradiation, which can provide a chip breaker in a desire shape. In particular, the shape of recess 7 of the chip breaker presented along cutting edge 4 can be precisely adjusted, and the throw-away tip's chip processability can be enhanced.

EXAMPLES

The present invention will now be more specifically described by way of examples. However, the present invention is not limited to these examples.

Example 1

In the present example, what effect the shape of the rake face of the recess has on chip processability and the amount of the flank worn in cutting was investigated.

A blade made of a polycrystalline hard sintered compact containing 90% by volume of diamond having an average grain size of 0.5 μm or less was brazed at a corner of the body, as shown in FIG. 1, and then ground with a diamond wheel to have a cutting edge.

Subsequently, a high output pulse $YVO_4$: Nd laser enhanced in condensability by a galvanometer mirror (wavelength: 1,064 nm) was employed with an output of 1.5 W, an oscillatory frequency of 22 kHz and a working pitch of 1 μm to proceed to carve the blade in contour lines in a constant working amount to form on an upper surface of the rake face of the blade a shape of a chip breaker having a three-dimensionally shaped recesses and projections. A variety of samples with rake faces varied in shape as shown in table 1 were produced and accessed in chip processability. The cutting conditions and the tool's shape are indicated below. In this assessment, chips of a range of 5 mm or more and 300 mm or less in length were determined as being satisfactory.

(Cutting Conditions)

Workpiece: cylindrical aluminum alloy (ADC12) Cutting method: external turning of a diameter of 100-95 (mm)×a length of 500 (mm)

Cutting manner: wet cutting
Cutting length: 10 km
Workpiece's circumferential surface speed: 400 (m/min)
Tool's cutting depth: 0.30 (mm)
Tool's feed rate: 0.10 (mm/rev)
(Tool's shape)
Description of tool used: DCMT11T304
Tool's material: polycrystalline hard sintered compact containing 90% by volume of diamond having an average grain size of 0.5 μm
Holder's description: SDJCL2525M11
Rake face's shape: identical to a portion of a shape indicated by that of a rake face indicated in table 1
Land surface's width (W1): 0.03 (mm)
Recess's maximum depth (D): 0.1 (mm)
Recess's width (W2): 0.3 (mm)
Projection's height (H): 0.05 (mm)
Projection's minimum width (W3): 0.020 (mm)
Rake face's surface roughness (Rz1): Rz3.2 (μm)
Land surface's surface roughness (Rz2): Rz0.06 (μm)
Breaker working condition: $YVO_4$: Nd laser (wavelength: 1,064 nm), with a frequency of 22 kHz, an output of 1.5 W, and a working pitch of 1 μm An evaluation result is indicated in table 1.

TABLE 1

| sample nos. | shape of rake face | length of chip (mm) | amount of wearing of flank (cutting length: 10 km) (mm) |
|---|---|---|---|
| 1A | no chip breaker | not shredded | 0.021 |
| 1B | ball (R0.395) | 50-100 | 0.075 (chipping occurred depending on the case) |

TABLE 1-continued

| sample nos. | shape of rake face | length of chip (mm) | amount of wearing of flank (cutting length: 10 km) (mm) |
|---|---|---|---|
| 1C | cone (angle of inclination α = 10°) | 100-200 | 0.023 |
| 1D | cone (angle of inclination α = 15°) | 30-50 | 0.024 |
| 1E | cone (angle of inclination α = 35°) | 30-50 | 0.023 |
| 1F | cone (angle of inclination α = 50°) | 30-50 | 0.027 |
| 1G | cone (angle of inclination α = 60°) | 30-50 | 0.080 (chipping occurred depending on the case) |

Sample 1A had a rake face without a chip breaker, and chips were not shredded and the workpiece was tangled with the chips. In contrast, samples 1B-1G had their rake faces in the form of a portion of a ball (or sphere) or cone and provided chips having a length of 300 mm or less and hence satisfactory chip processability. Inter alia, samples 1D-1F had their rake faces in the form of a cone and having an angle of inclination of 15° or more and 50° or less relative to the land surface, and thus provided chips having a length of 30-50 mm and hence particularly satisfactory chip processability. Sample 1G had a rake face in the form of a cone and having an angle of inclination of 60° relative to the land surface, and provided chips having a satisfactory length of 30-50 mm, although it had the cutting edge chipped when a cutting length of 10 km was reached. Sample 1B had a rake face in the form of a ball and provided chips having a satisfactory length of 30-50 mm, although it had the cutting edge chipped when a cutting length of 10 km was reached.

Thus, it has been found that a rake face having a shape identical to a portion of a shape of a body of revolution such as a ball, a cone or the like allows chips to have a length of 300 mm or less and allows satisfactory chip processability. Inter alia, it has been found that a throw-away tip having a rake face having a shape identical to a portion of a shape of a cone and an angle of inclination of 15° to 50° relative to the land surface allows chips to have a length of 30-50 mm and presents satisfactory chip processability, and as a tool it is increased in longevity as it did not have chipping even when a cutting length of 10 km was reached.

Example 2

What effect width W1 of the land surface has on chip processability and the amount of the flank worn in cutting was investigated. The tool was produced in a method similar to that in Example 1. A variety of samples with their land surfaces varied in width as shown in table 2 were produced and accessed in chip processability. The cutting conditions and the tool's shape are indicated below. In this assessment, chips of a range of 5 mm or more and 300 mm or less in length were determined as being satisfactory.

(Cutting Conditions)
Workpiece: cylindrical aluminum material (A6061)
Cutting method: external turning of a diameter of 100-95 (mm)×a length of 500 (mm)
Cutting manner: wet cutting
Cutting length: 10 km
Workpiece's circumferential surface speed: 400 (m/min)
Tool's cutting depth: 0.30 (mm)
Tool's feed rate: 0.10 (mm/rev)
(Tool's shape)
Description of tool used: DCMT11T304

Tool's material: polycrystalline hard sintered compact containing 90% by volume or more of diamond having an average grain size of 0.5 μm or less
Holder's description: SDJCL2525M11
Rake face's shape: identical to a portion of a side surface of a cone
Angle of inclination of the rake face relative to the land surface: 25°
Land surface's width (W1): see table 2
Recess's maximum depth (D): 0.1 (mm)
Recess's width (W2): 0.4 (mm)
Projection's height (H): 0.05 (mm)
Projection's minimum width (W3): 0.020 (mm)
Rake face's surface roughness (Rz1): Rz 3.5 (μm)
Land surface's surface roughness (Rz2): Rz 0.09 (μm)
Breaker working condition: YAG laser (wavelength: 1,064 nm), with a frequency of 20 kHz, an output of 1.5 W, and a working pitch of 1 μm An evaluation result is indicated in table 2.

TABLE 2

| sample nos. | width of land surface (W1) (μm) | length of chip (mm) | amount of wearing of flank (cutting length: 10 g km) (mm) |
|---|---|---|---|
| 2A | no chip breaker | not shredded | 0.014 |
| 2B | 5 | 50-100 | 0.045 (chipping occurred depending on the case) |
| 2C | 10 | 50-100 | 0.011 |
| 2D | 50 | 50-100 | 0.012 |
| 2E | 100 | 50-150 | 0.015 |
| 2F | 120 | 200-300 | 0.012 |

Sample 2A had a rake face without a chip breaker, and chips were not shredded and the workpiece was tangled with the chips. Samples 2B-2F had a chip breaker, and chips were shredded to have a length of 300 mm or less. Inter alia, samples 2B-2E had their land surfaces in a range in width of 5-100 μm, and provided chips having a length of 50-150 mm and hence particularly satisfactory chip processability. However, sample 2B had a land surface with a width of 5 μm, and had the cutting edge chipped when a cutting length of 10 km was reached.

It has thus been found that a rake face having a chip breaker allows chips to be shredded to have a length of 300 mm or less. In particular, it has been found that a land surface having a width in a range of 10-100 μm allows a throw-away tip to present satisfactory chip processability and stable endurance.

Example 3

What effect the recess's maximum depth (D) and width (W2) have on chip processability and the amount of the flank worn in cutting was investigated. Each sample indicated in table 3 was produced in a method similar to that in Example 1. In order to investigate only the effect of the maximum depth and width of the recess, the samples had chip breakers with recesses shaped to have similar figures. A variety of samples each with the recess's maximum depth and width varied as shown in table 3 were produced and accessed in chip processability. The cutting conditions and the tool's shape are indicated below. In this assessment, chips of a range of 5 mm or more and 300 mm or less in length were determined as being satisfactory.

(Cutting Conditions)
Workpiece: cylindrical aluminum material (A5052)
Cutting method: external turning of a diameter of 100-95 (mm)×a length of 500 (mm)
Cutting manner: wet cutting
Cutting length: 10 km
Workpiece's circumferential surface speed: 400 (m/min)
Tool's cutting depth: 0.6 (mm)
Tool's feed rate: 0.15 (mm/rev)
(Tool's shape)
Description of tool used: DCMT11T308
Tool's material: polycrystalline hard sintered compact containing 90% by volume of diamond having an average grain size of 0.5 μm or less
Holder's description: SDJCL2525M11
Rake face's shape: identical to a portion of a side surface of a cone
Angle of inclination of the rake face relative to the land surface: 25°
Land surface's width (W1): 0.030 (mm)
Recess's maximum depth (D): see table 3
Recess's width (W2): see table 3
Projection's height (H): 0.05 (mm)
Projection's minimum width (W3): 0.020 (mm)
Rake face's surface roughness (Rz1): Rz3.1 (μm)
Land surface's surface roughness (Rz2): Rz0.10 (μm)
Breaker working condition: YAG (wavelength: 532 nm), with a frequency of 60 kHz, an output of 2.5 W, and a working pitch of 1.8 μm An evaluation result is indicated in table 3.

TABLE 3

| sample nos. | maximum depth of recess (D) (mm) | width of recess (W2) (mm) | length of chip (mm) |
|---|---|---|---|
| 3A | no chip breaker | no chip breaker | not shredded |
| 3B | 0.03 | 0.17 | 200-300 |
| 3C | 0.06 | 0.20 | 100-200 |
| 3D | 0.10 | 0.40 | 50-150 |
| 3E | 0.20 | 0.74 | 100-200 |
| 3F | 0.30 | 1.00 | 100-200 |
| 3G | 0.36 | 1.20 | 200-300 |

Sample 3A had a rake face without a chip breaker, and chips were not shredded. In contrast, samples 3B-3G had a chip breaker, and chips had a length of 300 mm or less. Inter alia, samples 3C-3F had a recess with a maximum depth of 0.06 mm to 0.30 mm and a width of 0.20 mm to 1.00 mm and provided chips having a length of 200 mm or less and hence presented particularly satisfactory chip processability.

Thus it has been found that a recess having a maximum depth in a range of 0.06 mm to 0.30 mm and a width in a range of 0.20 mm to 1.00 mm allows particularly satisfactory chip processability.

Example 4

What effect height (H) of projection 8 has on chip processability in cutting was investigated. Each sample indicated in table 4 was produced in a method similar to that in Example 1. The samples were assessed in performance under cutting conditions with a tool having a shape, as follows:

(Cutting Conditions)
Workpiece: cylindrical aluminum material (A6063)
Cutting method: external turning of a diameter of 50 (mm)×a length of 100 (mm)
Cutting manner: dry cutting
Cutting length: 10 (km)
Workpiece's circumferential surface speed: 250 (m/min)
Tool's cutting depth: 0.10 (mm)
Tool's feed rate: 0.10 (mm/rev)
(Tool's shape)
Description of tool used: VCMT 160404
Tool's material: polycrystalline hard sintered compact containing 90% by volume of diamond having an average grain size of 0.5 μm or less
Holder's description: SVJCL2525M16
Rake face's shape: identical to a portion of a side surface of a cone
Angle of inclination of the rake face relative to the land surface: 25°
Land surface's width (W1): 0.030 (mm)
Recess's maximum depth (D): 0.1 (mm)
Recess's width (W2): 0.4 (mm)
Projection's height (H): see table 4
Projection's minimum width (W3): 0.020 (mm)
Rake face's surface roughness (Rz1): Rz 4.0 (μm)
Land surface's surface roughness (Rz2): Rz 0.1 (μm)
Breaker working condition: YAG (wavelength: 532 nm), with a frequency of 50 kHz, an output of 3.0 W, and a working pitch of 2 μm An evaluation result is indicated in table 4.

TABLE 4

| sample nos. | height of projection (mm) | length of chip (mm) | stability of shape of projection (cutting length: 10 km) |
|---|---|---|---|
| 4A | no breaker | not shredded | — |
| 4B | 0.00 mm | 200-300 | — |
| 4C | 0.02 mm | 100-200 | not worn |
| 4D | 0.05 mm | 50-150 | not worn |
| 4E | 0.08 mm | 50-150 | not worn |
| 4F | 0.10 mm | 50-150 | upper portion worn |

Sample 4A had a rake face without a chip breaker, and chips were not shredded. In contrast, samples 4B-4F had a chip breaker, and chips had a length of 300 mm or less. Inter alia, samples 4C-4F had a projection with height (H) of 0.02-0.10 mm and provided chips having a length of 200 mm or less and hence presented particularly satisfactory chip processability. However, sample 4F had the projection worn when a cutting length of 10 km was reached.

Thus when the recess has maximum depth (D) of 0.1 mm, a projection having height (H) in a range of 0.02-0.08 mm allows particularly satisfactory chip processability, and it has thus been found that satisfactory chip processability is provided when height (H) of the projection is in a range of 20-80% of maximum depth (D) of the recess.

Example 5

What effect the projection's cross sectional shape has on chip processability in cutting was investigated. Each sample indicated in table 5 was produced in a method similar to that in Example 1. The samples were assessed in performance under cutting conditions with a tool having a shape, as follows:

(Cutting Conditions)
Workpiece: cylindrical aluminum material (A6063)
Cutting method: external turning of a diameter of 50 (mm)×a length of 100 (mm)
Cutting manner: wet cutting Cutting length: 150 (m)
Workpiece's circumferential surface speed: 250 (m/min)
Tool's cutting depth: 0.80 (mm)
Tool's feed rate: 0.15 (mm/rev)
(Tool's shape)
Description of tool used: CCMTO9T308
Tool's material: polycrystalline hard sintered compact containing 90% by volume of diamond having an average grain size of 0.5 μm or less
Holder's description: SCLCL2525M09
Rake face's shape: identical to a portion of a side surface of a cone
Angle of inclination of the rake face relative to the land surface: 25°
Land surface's width (W1): 0.06 (mm)
Recess's maximum depth (D): 0.12 (mm)
Recess's width (W2): 0.6 (mm)
Projection's height (H): 0.05 (mm)
Projection's minimum width (W3): see table 5
Rake face's surface roughness (Rz1): Rz 4.5 (μm)
Land surface's surface roughness (Rz2): Rz 0.12 (μm)
Breaker working condition: $YVO_4$ laser (wavelength: 1,064 nm), with a frequency of 75 kHz, an output of 1.2 W, and a working pitch of 0.7 μm
An evaluation result is indicated in table 5.

TABLE 5

| sample nos. | cross section of projection (widthwise minimum value W3) | length of chip (mm) |
|---|---|---|
| 5A | no chip breaker | not shredded |
| 5B | no projection | 200-300 |
| 5C | arc (W3 = 0 μm) | 200-300 |
| 5D | trapezoid (trapezoid with W3 = 5 μm) | 50-150 |
| 5E | trapezoid (W3 = 20 μm) | 50-150 |
| 5F | trapezoid (W3 = 40 μm) | 50-150 |
| 5G | trapezoid (W3 = 80 μm) | 200-300 |

Sample 5A had a rake face without a chip breaker, and chips were not shredded. In contrast, samples 5B-5G had a chip breaker, and chips had a length of 300 mm or less. Inter alia, samples 5D-5F had a projection having a trapezoidal cross section and an upper surface having a width (W3) of 5 μm to 40 μm, and provided chips having a length of 50-150 mm and hence presented particularly satisfactory chip processability.

The projection has a uniform cross section along the bisector of the corner angle of the tool. As indicated in Example 3, in order to exhibit satisfactory chip processability, width (W2) of the recess needs to be in a range of 0.20-1.0 mm, and as indicated in Example 4, height (H) of the projection needs be a height of 20-80% of maximum depth (D) of the recess. Accordingly, the projection as seen along the bisector of the corner angle needs to have length (W5) equal to or smaller than width (W2) of the recess.

Thus it has been found that particularly satisfactory chip processability is exhibited when the projection has a trapezoidal cross section having a widthwise minimum value (W3) in a range of 5 μm to 40 μm and along the bisector of the corner angle has length (W5) in a range of 0.20-1.0 mm.

Example 6

What effect the rake face's surface roughness (Rz1) has on chip processability in cutting was investigated. The samples had their chip breakers worked under a variety of laser machining conditions to have rake faces having worked surfaces different in surface roughness, as indicated in table 6. The samples were assessed in performance under cutting conditions with a tool having a shape, as follows:
(Cutting Conditions)
Workpiece: cylindrical aluminum material (A5052)
Cutting method: external turning of a diameter of 100-95 (mm)×a length of 500 (mm)
Cutting manner: wet cutting
Cutting length: 10 km
Workpiece's circumferential surface speed: 400 (m/min)
Tool's cutting depth: 0.30 (mm)
Tool's feed rate: 0.10 (mm/rev)
(Tool's shape)
Description of tool used: DCMT11T304
Tool's material: polycrystalline hard sintered compact containing 90% by volume of diamond having an average grain size of 0.5 μm or less
Holder's description: SDJCL2525M11
Rake face's shape: identical to a portion of a side surface of a cone
Angle of inclination of the rake face relative to the land surface: 25°
Land surface's width (W1): 0.01 (mm)
Recess's maximum depth (D): 0.1 (mm)
Recess's width (W2): 0.4 (mm)
Projection's height (H): 0.05 (mm)
Projection's minimum width (W3): 0.020 (mm)
Rake face's surface roughness (Rz1): see table 6
Land surface's surface roughness (Rz2): Rz0.08 (μm)
Working conditions: $YVO_4$ (wavelength: 1064 nm), and see table 6
An evaluation result is indicated in table 6.

TABLE 6

| sample nos. | laser machining conditions | Rake face's surface roughness (Rz1) | length of chip (mm) | finished surface roughness |
|---|---|---|---|---|
| 6A | no chip breaker | Rz 0.09 μm | not shredded | Rz 3.47 μm |
| 6B | frequency of 100 kHz, output of 1.0 W, and pitch of 0.25 μm | Rz 1.2 μm | 100-300 | Rz 3.51 μm |
| 6C | frequency of 80 kHz, output of 1.2 W, and pitch of 0.4 μm | Rz 2.0 μm | 50-150 | Rz 3.50 μm |
| 6D | frequency of 20 kHz, output of 1.5 W, and pitch of 0.5 μm | Rz 3.8 μm | 50-150 | Rz 3.22 μm |
| 6E | frequency of 20 kHz, output of 5.5 W, and pitch of 1.0 μm | Rz 4.0 μm | 50-100 | Rz 3.30 μm |
| 6F | frequency of 50 kHz, output of 12.0 W, and pitch of 1.6 μm | Rz 7.0 μm | 50-100 | Rz 3.11 μm |
| 6G | frequency of 50 kHz, output of 14.9 W, and pitch of 2.0 μm | Rz 7.8 μm | 50-100 | Rz 4.92 μm |

Sample 6A had a rake face without a chip breaker, and chips were not shredded. In contrast, samples 6B-6G had a chip breaker, and chips had a length of 300 mm or less. Inter alia, samples 6C-6G had a rake face with surface roughness Rz1 of Rz 2.0 µm or more and provided chips having a length of 50-150 mm and hence presented particularly satisfactory chip processability. This is because a rake face having coarser surface roughness Rz1 increases resistance caused when chips scratch, resulting in chips curled to be small. However, a rake face having excessively large surface roughness increases adhesion of a cut material to the rake face, and while satisfactory chip processability is presented, finished surface roughness is worsened depending on the case, as presented by sample 6G.

Example 7

What effect the land surface's surface roughness (Rz2) has on chip processability and finished surface roughness in cutting was investigated. The samples had land surfaces formed by lapping done for a variety of periods of time to have the land surfaces with worked surfaces different in surface roughness, as indicated in table 7. The samples were assessed in performance under cutting conditions with a tool having a shape, as follows:
(Cutting Conditions)
Workpiece: cylindrical aluminum material (A5052)
Cutting method: external turning of a diameter of 100-95 (mm)×a length of 500 (mm)
Cutting manner: wet cutting
Cutting length: 10 km
Workpiece's circumferential surface speed: 400 (m/min)
Tool's cutting depth: 0.30 (mm)
Tool's feed rate: 0.10 (mm/rev)
(Tool's shape)
Description of tool used: DCMT11T304
Tool's material: polycrystalline hard sintered compact containing 90% by volume of diamond having an average grain size of 0.5 µm or less
Holder's description: SDJCL2525M11
Rake face's shape: identical to a portion of a side surface of a cone
Angle of inclination of the rake face relative to the land surface: 25°
Land surface's width (W1): 0.01 (mm)
Recess's maximum depth (D): 0.1 (mm)
Recess's width (W2): 0.4 (mm)
Projection's height (H): 0.05 (mm)
Projection's minimum width (W3): 0.020 (mm)
Rake face's surface roughness (Rz1): Rz4.0 (µm)
Land surface's surface roughness (Rz2): see table 7
Working condition: YVO$_4$ (wavelength: 1,064 nm), with a frequency of 20 kHz, an output of 5.5 W, and a working pitch of 1 µm
An evaluation result is indicated in table 7.

TABLE 7

| sample nos. | Lapping time (hrs) | roughness of land surface (Rz2) | length of chip (mm) | finished surface roughness |
| --- | --- | --- | --- | --- |
| 7A | 16 | Rz 0.01 µm | 50-100 | Rz 3.47 µm |
| 7B | 8 | Rz 0.05 µm | 50-100 | Rz 3.51 µm |
| 7C | 7 | Rz 0.12 µm | 50-100 | Rz 3.50 µm |
| 7D | 6 | Rz 0.20 µm | 50-100 | Rz 3.22 µm |
| 7E | 6 | Rz 0.28 µm | 50-100 | Rz 5.22 µm |

Samples 7A-7E had a chip breaker, and chips had a length of 100 mm or less. However, a land surface having excessively large surface roughness impairs the cutting edge's edge sharpening performance, and while satisfactory chip processability is presented, finished surface roughness is worsened depending on the case, as presented by sample 7E. In contrast, land surface roughness Rz2 of about Rz0.01 as sample 7A has, requires lapping for 10 hours or more, which is not economical.

Thus, a rake face having surface roughness Rz1 in a range of Rz2.0-7.0 µm and a land surface having surface roughness Rz2 in a range of Rz0.05-0.20 µm allow chips to have a length of 150 mm or less and thus provide particularly satisfactory chips.

Example 8

What effect the tool's material has on chip processability and wearing of the flank in cutting was investigated. Tools were formed of three types of materials as indicated in table 8. The chip breaker was produced by laser machining under the following working conditions. The samples were assessed in performance under cutting conditions with a tool having a shape, as follows:
(Cutting Conditions)
Workpiece: cylindrical aluminum material (A390)
Cutting method: external turning of a diameter of 100-95 (mm)×a length of 500 (mm)
Cutting manner: wet cutting
Cutting length: 10 km
Workpiece's circumferential surface speed: 800 (m/min)
Tool's cutting depth: 0.50 (mm)
Tool's feed rate: 0.15 (mm/rev)
(Tool's shape)
Description of tool used: DCMT11T304
Tool's material
Sample 8A: polycrystalline hard sintered compact containing 90% by volume of diamond having an average grain size of 0.5 µm or less
Sample 8B: polycrystalline hard sintered compact containing 90% by volume of diamond having an average grain size of 0.5 µm or less
Sample 8C: single crystal diamond synthesized by chemical vapor deposition (CVD)
Sample 8D: single crystal diamond synthesized by a high pressure and high temperature synthesis method
Holder's description: SDJCL2525M11
Rake face's shape: identical to a portion of a side surface of a cone
Angle of inclination of the rake face relative to the land surface: 25°
Land surface's width (W1): 0.03 (mm)
Recess's maximum depth (D): 0.1 (mm)
Recess's width (W2): 0.4 (mm)
Projection's height (H): 0.05 (mm)
Projection's minimum width (W3): 0.020 (mm)
Breaker rake face surface roughness (Rz1): Rz 2.0-6.5 (µm)
Breaker land surface roughness (Rz2): Rz 0.08-0.12 (µm)

Breaker working condition:

Sample 8B: YAG laser, with a wavelength of 1,064 nm, a frequency of 30 kHz, an output of 1.5 W, and a working pitch of 1 μm Sample 8C: YAG laser, with a wavelength of 1,064 nm, a frequency of 50 kHz, an output of 5.5 W, and a working pitch of 5 μm Sample 8D: unworkable Table 8 shows an evaluation result.

TABLE 8

| sample nos. | type of material | presence/absence of chip breaker | absorption coefficient for wavelength of 1064 nm (cm$^{-1}$) | length of chip (mm) | amount of wearing of flank (cutting length: 10 km) (mm) |
|---|---|---|---|---|---|
| 8A | polycrystalline diamond | absent | 100 or more | not shredded | 0.035 |
| 8B | polycrystalline diamond | present | 100 or more | 50-150 | 0.033 |
| 8C | CVD single crystal diamond | present | 8 | 50-150 | 0.008 |
| 8D | single crystal diamond | present | 0.01 or less | — | — |

The polycrystalline hard sintered compact used for samples 8A and 8B and the single crystal diamond synthesized by CVD and used for sample 8C had an absorption rate of 2 cm$^{-1}$ or more, and were thus workable by laser machining. In contrast, the single crystal diamond of sample 8D had an absorption coefficient of 0.01 cm$^{-1}$ or less and was thus unworkable by laser machining.

A cutting assessment provided a result as follows: Sample 8A had a rake face without a chip breaker, and chips were not shredded. In contrast, samples 8B and 8C had a chip breaker, and chips had a length of 50-150 μm, and satisfactory chip processability was presented. Furthermore, sample 8C using CVD single crystal diamond had the flank worn in an amount of 0.008 mm when a cutting length of 10 km was reached, and sample 8C presented a significantly smaller amount of wearing than samples 8A and 8B using polycrystalline hard sintered compact.

It should be understood that the embodiments and examples disclosed herein have been described for the purpose of illustration only and in a non-restrictive manner in any respect. The scope of the present invention is defined by the terms of the claims, rather than the embodiments above, and is intended to include any modifications within the meaning and scope equivalent to the terms of the claims.

INDUSTRIAL APPLICABILITY

The throw-away tip of the present embodiment is beneficial when it is used for tools and the like used in turning and milling aluminum alloy, nonferrous metal and the like.

REFERENCE SIGNS LIST

1: throw-away tip; 2: body; 3: blade; 4: cutting edge; 5: land surface; 6: rake face; 7: recess; 8: projection; 16: breaker's wall surface; 31: upper surface of blade; 32: side surface of blade; 33: flank.

The invention claimed is:

1. A throw-away tip comprising a body and a blade provided to the body and having a cutting edge,
the blade containing 80% by volume or more of diamond,
the blade having a land surface extending along the cutting edge, and a chip breaker having a recess located opposite to the cutting edge with the land surface therebetween,
the recess having a side surface having a rake face that recedes continuously from the land surface as a distance toward a center of the blade increases in magnitude, wherein
the rake face has a shape identical to a portion of a side surface of a cone;
the blade has a corner;
the recess has on the side surface of the recess a projection formed along a bisector of an angle of the corner;
the projection has a height in a range of 20% or more and 80% or less relative to a maximum depth of the recess;
the maximum depth of the recess is a maximum value of a distance to a bottom of the recess from a plane assumed when the land surface is extended to above the recess; and
the cone has an axis on the bisector of the angle of the corner of the blade.

2. The throw-away tip according to claim 1, wherein an angle of inclination of the rake face relative to the land surface is in a range of 15° or more and 50° or less.

3. The throw-away tip according to claim 1, wherein the land surface has a width in a direction perpendicular to the cutting edge in a range of 10 μm or more and 100 μm or less.

4. The throw-away tip according to claim 1, wherein the recess has a maximum depth in a range of 60 μm or more and 300 μm or less.

5. The throw-away tip according to claim 1, wherein the recess has a width in a direction perpendicular to the cutting edge in a range of 0.2 mm or more and 1.0 mm or less.

6. The throw-away tip according to claim 1, wherein when the projection is seen in a cross section to which the bisector of the angle of the corner is a normal, the projection has a cross sectional shape increasing in width as the recess becomes deeper; and
the cross sectional shape in a widthwise direction has a minimum value in a range of 5 μm or more and 40 μm or less.

7. The throw-away tip according to claim 1, wherein the projection has a length in a direction along the bisector of the angle of the corner in a range of 0.2 mm or more and 1.0 mm or less.

8. The throw-away tip according to claim 1, wherein:
the land surface has a surface roughness in a range of 0.05 μm or more and 0.2 μm or less; and
the rake face has a surface roughness in a range of 2 μm or more and 7 μm or less.

9. The throw-away tip according to claim 1, wherein the diamond is single crystal diamond synthesized by vapor deposition.

10. The throw-away tip according to claim 9, wherein the single crystal diamond has an absorption coefficient in a range of 2 cm$^{-1}$ or more and 90 cm$^{-1}$ or less for laser light of 190 μm or more and 11000 μm or less in wavelength.

11. The throw-away tip according to claim 1, wherein the land surface, the rake face, the projection, a breaker wall surface, and an upper surface are arranged in order along the bisector,
and
wherein a width of the rake face along the bisector is larger than a width of the breaker wall surface along the bisector.

12. The throw-away tip according to claim 1, wherein the land surface, the rake face, the projection, a breaker wall surface, and an upper surface are arranged in order along the bisector,
and
wherein a width of the rake face and the breaker wall surface along the bisector is greater than a width of the land surface along the bisector.

13. The throw-away tip according to claim 1, wherein the rake face is linear along the bisector.

* * * * *

UNITED STATES PATENT AND TRADEMARK OFFICE
CERTIFICATE OF CORRECTION

PATENT NO. : 10,286,455 B2
APPLICATION NO. : 15/027394
DATED : May 14, 2019
INVENTOR(S) : Yuji Tomoda et al.

It is certified that error appears in the above-identified patent and that said Letters Patent is hereby corrected as shown below:

In the Claims

Claim 10, at Column 19, in Line 2, "190 μm or more and 11000 μm or less in wavelength." should be --190 nm or more and 11000 nm or less in wavelength.--.

Signed and Sealed this
Twenty-ninth Day of October, 2019

Andrei Iancu
*Director of the United States Patent and Trademark Office*